Sept. 7, 1965          S. F. DANIELEWICZ          3,204,899
FISHING POLE HOLDER
Filed May 27, 1963
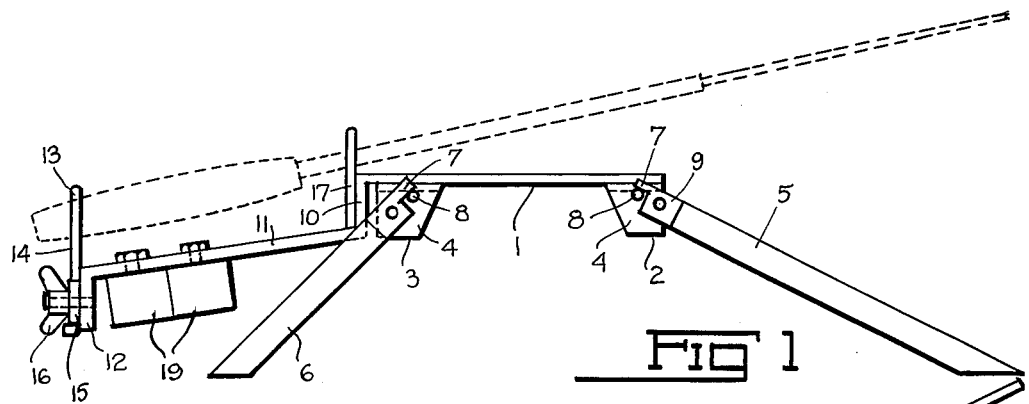
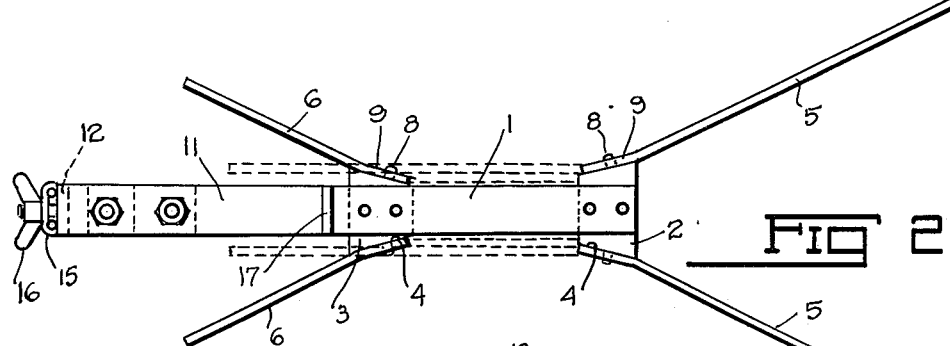
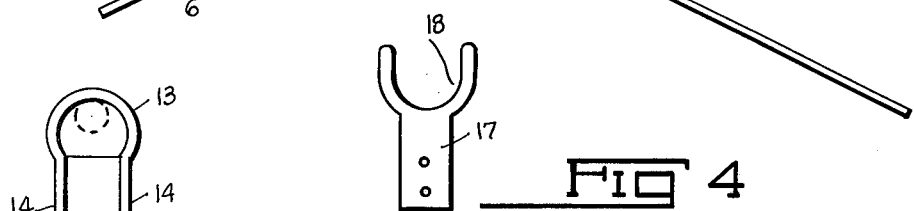
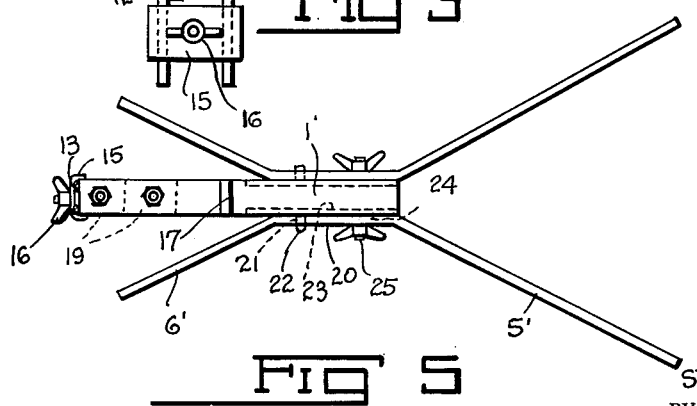
INVENTOR.
STANLEY F. DANIELEWICZ
BY Charles Richard Werner
ATTORNEY

United States Patent Office 3,204,899
Patented Sept. 7, 1965

3,204,899
FISHING POLE HOLDER
Stanley F. Danielewicz, 5026 S. Fairfield, Chicago, Ill.
Filed May 27, 1963, Ser. No. 283,367
14 Claims. (Cl. 248—46)

This invention relates in general to fishing pole holders and particularly to self-supporting holders adapted to removably receive the fishing pole in an eccentric position whereby the weight of the pole will not overbalance the holder.

I am aware that there are many different types of fishing pole holders but I have directed my invention to a type which is relatively inexpensive, simple in construction, foldable for ease in transporting and stowing, and efficient in operation.

It is the primary object of my invention to provide a fishing pole holder having a plurality of substantially oppositely disposed legs extending from a longitudinal axis, and fishing pole supporting means extending in offset relation to the legs but in alignment with the longitudinal axis, whereby the center of gravity of the holder will be located in offset relation to the legs in order to prevent overturning of the holder.

It is another object of my invention to provide foldable legs to facilitate carrying and stowing the holder.

One more object of the invention is to provide an offset member carrying fishing pole receiving members and removable weights to help counterbalance the weight of the fishing pole.

And still another object of my invention is to provide a modified form thereof in which the legs are formed in two opposite integral sets, each integral set of two legs being clamped to central support in a simple manner so that the legs can be easily disassembled for storing or transporting.

Other objects and advantages, as well as the construction and manner of use of my invention will be better understood by reference to the following description in connection with the accompanying drawing in which:

FIG. 1 is a side elevational view of one form of my fishing pole holder.

FIG. 2 is a top plan view of the same, with the folded position of the legs shown in dotted lines.

FIG. 3 is an enlarged end detail view of the adjustable fishing pole supporting members.

FIG. 4 is an enlarged end view of the fixed supporting member for the fishing pole.

FIG. 5 is a reduced top plan view of a modified form of my fishing pole holder in which another form of leg construction has been employed.

Referring now to the drawing by numerals of reference, 1 designates a central elongated support member carrying spaced blocks 2 and 3, each having a pair of vertical planar faces 4, angularly disposed with respect to the longitudinal center line of the support 1 to converge toward the approximate mid-section of said support.

Legs 5 and 6 are pivotally carried on blocks 2 and 3 and have extensions 7 to contact pins 8 on said blocks for limiting the movement of the legs when in open position. The end 9 of each leg lies parallel to its respective planar face 4 while the remainder of each leg is angularly related to the end 9 in order to spread the legs farther apart when they contact the surface on which the device rests.

It is further to be noted that legs 6 are considerably shorter than legs 5 for the purpose hereinafter indicated.

In this construction, the legs 5 and 6 may be pivoted to folded position as shown in dotted lines in FIG. 2. To aid in this feature the block 3 is lesser in width than block 2 so that when folded, legs 6 will lie adjacent center support 1 and legs 5 will lie adjacent legs 6.

In close proximity to block 3 the central support member 1 is provided with a depending portion 10 from which projects the extension 11 preferably in slightly angular relation downwardly from the plane of central support member 1. At the free end of extension 11 is a depending flange 12 to which may be attached a fishing pole support comprising a loop 13 with depending arms 14 slidably held in position by clamp 15 and screw 16. At the depending portion 10 may be secured a second fishing pole support 17 with notch 18 in which the pole may freely rest. One or more weights 19 may be removably carried below the extension 11.

In a modification of my invention shown in FIG. 5, the legs are formed in pairs, each pair consisting of legs 5' and 6' with a connecting web 20. Apertures 21 in web 20 may be positioned on pin 22 secured to side 23 of central support member 1'. A second aperture 24 may receive a fastening member 25 which may be in threaded engagement with threaded aperture in side 23 of the central support member 1'. Thus, by removal of the two fastening members 25 the legs may be quickly removed for stowage and transporting the fishing pole holder.

In both forms of my invention, with the fishing pole in position in loop 13 and on support 17, the center of gravity will be in the vicinity of the legs 6 and the possibility of overbalancing the holder is considerably diminished. One or more weights 19 may be used depending on the weight of the fishing pole.

The holder may be used on any flat surface and may be designed to fit in a tackle box when disassembled. It need not be clamped to any other support and therefore its flexibility of use is greatly enhanced over the type requiring some fixed member to which it must be secured.

From the foregoing it will be seen that I have designed a fishing pole holder of simple and inexpensive construction, capable of being folded or disassembled to render it compact for stowage or carrying, and adapted for use with fishing poles of various sizes, without requiring clamping of the device to a fixed object and capable of securing the fishing pole with a minimum possibility of overturning, thereby requiring no attendance by the user.

It is obvious that changes in form, proportion and details of construction may be resorted to without departing from the spirit of my invention and I reserve all rights to such changes as fall within the scope of these specifications and the claims which follow.

What I claim as new and desire to secure by Letters Patent is:

1. A fishing pole holder including oppositely disposed front and rear pairs of legs positioned about a longitudinal axis,
   and fishing pole supporting means offset rearwardly of the rear pair of legs and positioned along said longitudinal axis.

2. The structure as specified in claim 1, and including weight means located rearwardly of the rear pair of legs and carried by the fishing pole supporting means to offset the weight of the fishing pole.

3. The structure as specified in claim 1, the pair of legs adjacent the fishing pole supporting means being shorter than the other pair of legs,
   the center of gravity of the fishing pole holder with the fishing pole applied thereto being adjacent the shorter pair of legs.

4. The structure as specified in claim 1, said legs being individually pivotable to a folded or opened position.

5. The structure as specified in claim 1, including a central leg receiving member lying along said longitudinal axis,
  said fishing pole supporting means including an extension member extending from the central leg receiving member and lying along said longitudinal axis,
    and spaced pole engaging members adjacent the ends of the extension member.

6. The structure as specified in claim 5, at least one of said spaced pole engaging members being vertically adjustable, to change the angle of the rod on the holder.

7. The structure as specified in claim 5, including one or more weight members carried by the extension member.

8. The structure as specified in claim 5, including one or more weight members removably carried by the extension member.

9. The structure as specified in claim 5, said extension member being angularly disposed downwardly from the central leg receiving means.

10. A fishing pole holder comprising a central elongated support,
  a plurality of leg members extending outwardly and downwardly from the central support,
  a support extension extending from the central support and along the longitudinal axis thereof,
  a pair of spaced pole supporting members,
    one of said pole supporting members being located adjacent the end of the support extension and the other pole supporting member being located adjacent the juncture of the support extension and the central support.

11. The structure as specified in claim 10, said leg members comprising opposing pairs of leg members,
  each pair of leg members comprising a unit,
    and means for removably securing each pair of legs as a unit to the central support.

12. The structure as specified in claim 10, said central support including opposed spaced pairs of vertically disposed planar faces,
  the faces of each pair of planar faces being angularly related and converging toward the center of the central support,
    each planar face having a leg member pivotally carried thereon,
    and stop means for limiting the movement of the leg after it has been moved to supporting position.

13. The structure as specified in claim 12, the pivoted end of each leg being angularly disposed in relation to the remaining part of the leg to increase the angle between the legs when in opened position.

14. A fishing pole holder comprising a central elongated member,
  oppositely disposed end portions on the central member,
    each end portion having oppositely disposed angufaces,
      the angle of the faces on each end portion converging toward a point of intersection between the ends of the central member,
  the central member having a downwardly extending portion adjacent one of the end portions,
    an extension member carried at the lower end of said downwardly extending portion directed away from said end portion and in alignment with the central member,
      a downwardly extending portion at the end of the extension member,
        an adjustable loop member carried by said last-named downwardly extending portion,
    and a supporting member carried at the first-mentioned downwardly extending portion at the juncture of the central member and the extension member,
      said loop member and supporting member being adapted to removably receive a fishing pole,
  and one or more weights receivable by the extension member.

References Cited by the Examiner

UNITED STATES PATENTS

| | | | |
|---|---|---|---|
| 1,876,478 | 9/32 | Van Duzer | 248—38 |
| 2,216,187 | 10/40 | Dion | 248—190 X |
| 2,466,166 | 4/49 | Fischer | 248—48 |
| 2,843,347 | 7/58 | King | 248—44 |
| 2,899,155 | 8/59 | Rogers | 248—46 |

CLAUDE A. LE ROY, *Primary Examiner.*